INVENTORS.
Thomas Barish
Charles F. Irwin
Russel E. Line and
Clifford B. Wright

By Craig V. Morton
Their Attorney

Feb. 5, 1957 T. BARISH ET AL 2,780,298
BLADE SEAL ASSEMBLY
Filed March 1, 1954 5 Sheets-Sheet 2
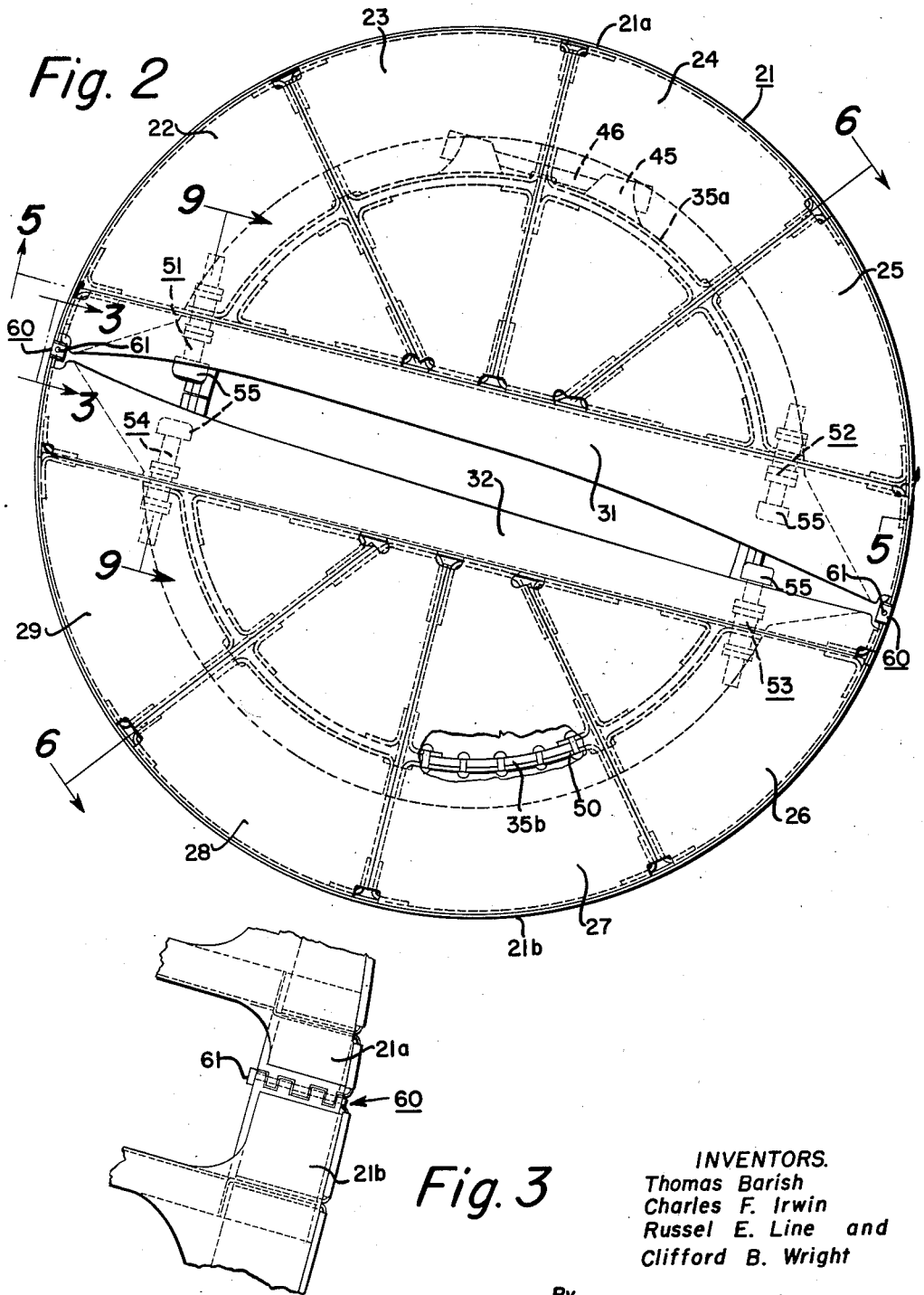
INVENTORS.
Thomas Barish
Charles F. Irwin
Russel E. Line and
Clifford B. Wright
By Craig V. Morton
Their Attorney INVENTORS.
Thomas Barish
Charles F. Irwin
Russel E. Line and
Clifford B. Wright By Craig V. Morton
Their Attorney INVENTORS.
Thomas Barish
Charles F. Irwin
Russel E. Line. and
Clifford B. Wright By Craig V. Morton
Their Attorney Feb. 5, 1957 T. BARISH ET AL 2,780,298
BLADE SEAL ASSEMBLY
Filed March 1, 1954 5 Sheets-Sheet 5

INVENTORS.
Thomas Barish
Charles F. Irwin
Russel E. Line and
Clifford B. Wright
By
Craig V. Morton
Their Attorney United States Patent Office 2,780,298
Patented Feb. 5, 1957

2,780,298

BLADE SEAL ASSEMBLY

Thomas Barish, Cleveland, Charles F. Irwin, Tipp City, Russel E. Line, Dayton, and Clifford B. Wright, Tipp City, Ohio, assignors to General Motors Corporation, Detroit, Mich., a corporation of Delaware Application March 1, 1954, Serial No. 413,102

9 Claims. (Cl. 170—160.23)

This invention pertains to means for sealing openings in airfoil surfaces, and particularly to blade seals for the cutouts of an aircraft spinner.

Heretofore, it has been common practice to support blade seals on the blades of an aircraft propeller. However, in recent years, and due primarily to the advent of the turbo-prop, propeller assemblies have been designed to absorb greater torque loads, which necessarily result in larger blades. Thus, it became apparent that imposing additional centrifugal loads on the blades, such as those imposed by blade seals, would be undesirable. Accordingly, among our objects are the provision of a blade seal assembly for an aircraft spinner; the further provision of a seal assembly supported by the propeller hub; and the still further provision of a seal assembly including means for effectively sealing spinner cutouts, and, yet, minimize the centrifugal load imposed on the propeller blades by eliminating the blade cuff ring connection between the seal assembly and the blade which resulted in a stress concentration on the blade root.

The aforementioned and other objects are accomplished in the present invention by providing a blade seal assembly which is carried by the propeller hub, and, yet, provides adequate blade sealing. Specifically, the blade seal assembly is adapted for use with a propeller assembly having a spinner with a plurality of cutouts through which the blades project in a radial direction. Such a spinner may be of the type shown in copending application Serial No. 276,311, filed March 13, 1952, in the name of Blanchard, et al., now Patent No. 2,745,501. It will be appreciated that inasmuch as the propeller blades are mounted for rotation about their longitudinal axes to different pitch positions, the spinner cutouts must be substantially circular. Accordingly, in order to prevent undesirable turbulent air flow, blade seal means, which are rotatable with the blades, must be provided for substantially closing the spinner cutouts.

In the present invention the blade seal assembly comprises a cover including a plurality of segments which are joined to an outer split annulus having a frusto conical portion. The segments are joined to blade sealing members at their inner ends, while the frusto conical portion of the split annulus extends radially towards the propeller shaft for attachment to a split supporting ring. The supporting ring is, in turn, rotatably supported by the propeller hub so that substantially all centrifugal loads are imposed thereon.

Further objects and advantages of the present invention will be apparent from the following description, reference being had to the accompanying drawings wherein a preferred embodiment of the present invention is clearly shown.

In the drawings:

Fig. 2 is a view, in elevation, of the top of the blade seal assembly, with the blade removed.

Fig. 3 is a sectional view taken along line 3—3 of Fig. 2.

Figure 1:
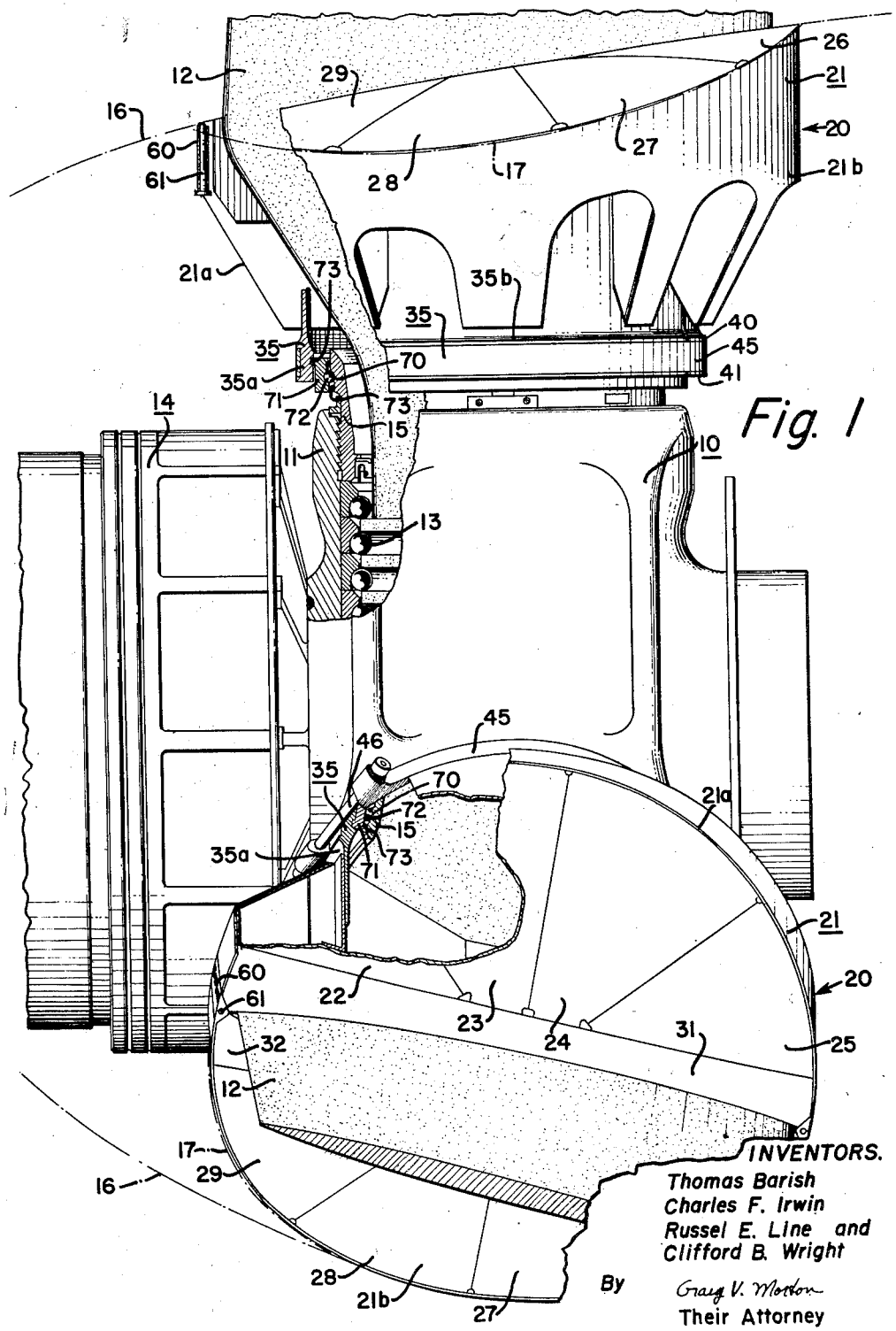
Fig. 1 is a fragmentary view, partly in section and partly in elevation, of a propeller assembly having blade seals constructed according to this invention, the spinner profile and cutouts being depicted by broken lines.
Figure 4:
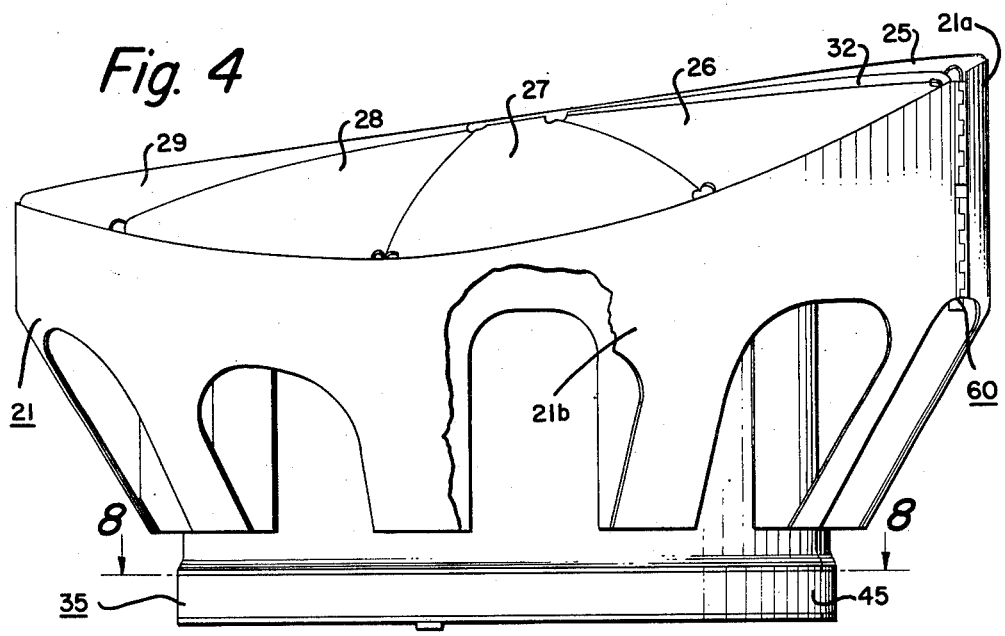
Fig. 4 is a view, in elevation, of a sub-assembly used in constructing the blade seals of this invention.

With particular reference to Fig. 1 of the drawings, the blade seal assembly of this invention is illustrated in conjunction with a variable pitch propeller including a hub 10 having a plurality of radially extending sockets 11 within which propeller blades 12 are supported for rotation about their longitudinal axes by bearing means 13. The bearing means 13 also function as thrust bearings to prevent radial movement of the blades 12 due to centrifugal loading caused by propeller rotation. The hub 10 has attached thereto a regulator assembly 14, which forms no part of this invention. Suffice it to say, that the regulator assembly includes pressure developing means and valve means for directing pressure fluid to pitch changing means carried by the hub 10 for rotating the propeller blades 12 about their longitudinal axes to different pitch positions. The hub 10 and the regulator 14 may be enclosed by a spinner shell, which rotates with the propeller and constitutes an airfoil covering therefor. The spinner may be of the type disclosed in the aforementioned copending application, and, hence, includes a plurality of cutouts through which the blades 12 project.

This invention relates particularly to means for sealing the cutout openings of the spinner, which means are constituted by blade seal assemblies designated by the numeral 20 in Fig. 1. The spinner, which is of suitable aerodynamic shape is indicated by the broken lines 16 in Fig. 1, and includes cutout openings indicated by broken lines 17.

With reference to Figs. 2, 4, 5, 6 and 7, the construction of each seal assembly 20 will be described. Each seal assembly 20 includes a blade seal shell 21, which comprises annular member having a frusto conical end portion with a series of circumferentially spaced slots, as is particularly shown in Fig. 4. The shell 21 is made in two sections 21a and 21b, which are thereafter connected together, as will be set forth hereinafter. The circumferentially spaced slots, or openings, in the shell sections reduce the weight of the seal assembly, and also facilitate adjustment of the blade gripping means, to be described. The split shell has attached thereto a plurality of pie-shaped segments 22 through 29 and a pair of blade sealing members 31 and 32, which define an opening of airfoil section. Each pie-shaped segment, as well as the members 31 and 32, are formed with vertical gusset portions which are riveted to the split shell 21. More particularly, the vertical gusset portions of segments 22 through 25 and member 31 are riveted to each other, as well as to the shell section 21a, while the vertical gusset portions of segments 26 through 29 and the member 32 are riveted to each other and to shell section 21b. The segments 22 through 29 and the members 31 and 32 form covers for the spinner cutouts, the members 31 and 32 defining an opening through which blades of different sizes and airfoil shapes may extend. This feature permits interchangeability of blade seals on different propeller assemblies.

Figure 6:
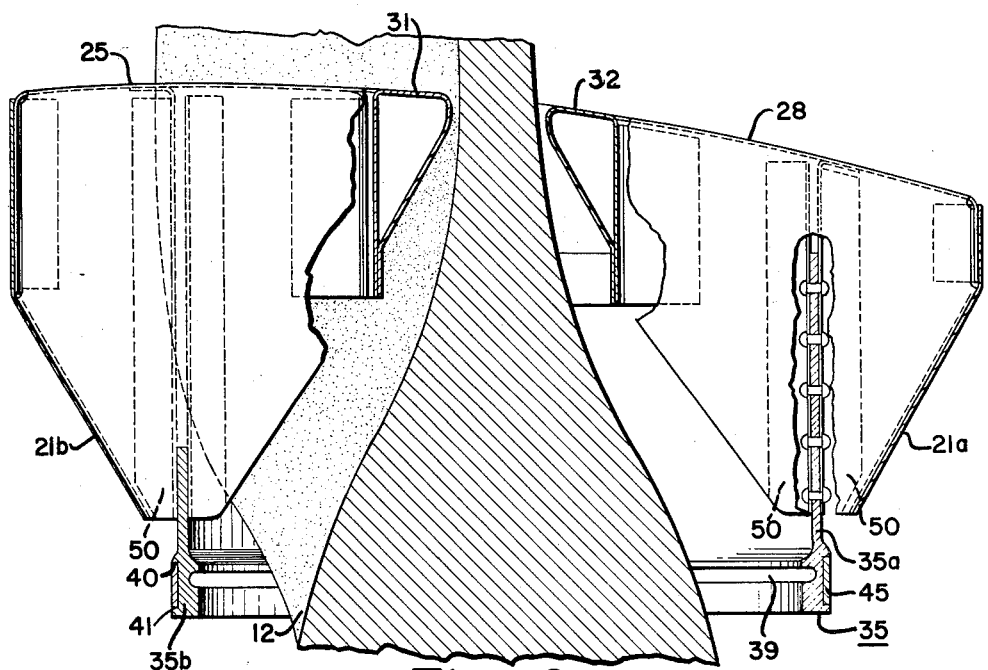
Fig. 6 is a sectional view taken along line 6—6 of Fig. 2, with the propeller blade shown extending through the seal assembly.
Figure 7:
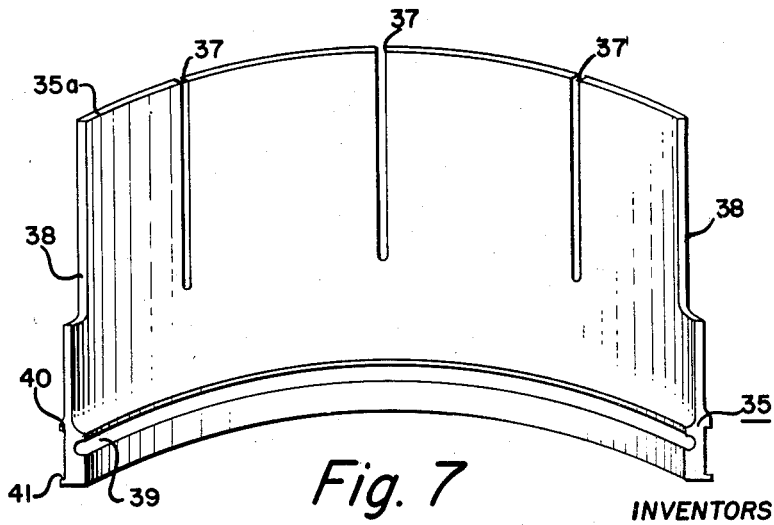
Fig. 7 is a view, in perspective, of one part of the split supporting ring.

The vertical gusset portions of segments 22 through 29 also have attached thereto angle sections, or brackets, which are designated generally by the numeral 50. As is seen particularly in Fig. 6, the brackets 50, carried by the gusset portions of the segmental members, are spaced from each other to form openings adapted to receive projecting surfaces of a split supporting ring, designated generally by the numeral 35. The supporting ring 35 comprises two semi-circular members 35a and 35b, of identical construction. As is shown in Fig. 7, the semi-circular member 35a is formed with a plurality of circumferentially spaced, axially extending openings 37 of the same size, and notched portions 38 through which the airfoil portion of the blade 12 extends. In addition, each of the semi-circular members 35a and 35b is formed with an internal groove 39 and a pair of spaced shoulders 40 and 41 on its external surface. The inwardly extending gusset portions of the juxtaposed segments 22 through 25 are received by the slots 37 in member 35a, and the bracket portions 50 thereof are riveted to the member 35a, as shown in Fig. 6. Similarly, the inwardly extending gusset portions of juxtaposed segments 26 through 29 are received by the slots 37 in the member 35b and the brackets 50 thereof are likewise riveted to the member 35b, as shown in Fig. 2.

Figure 5:
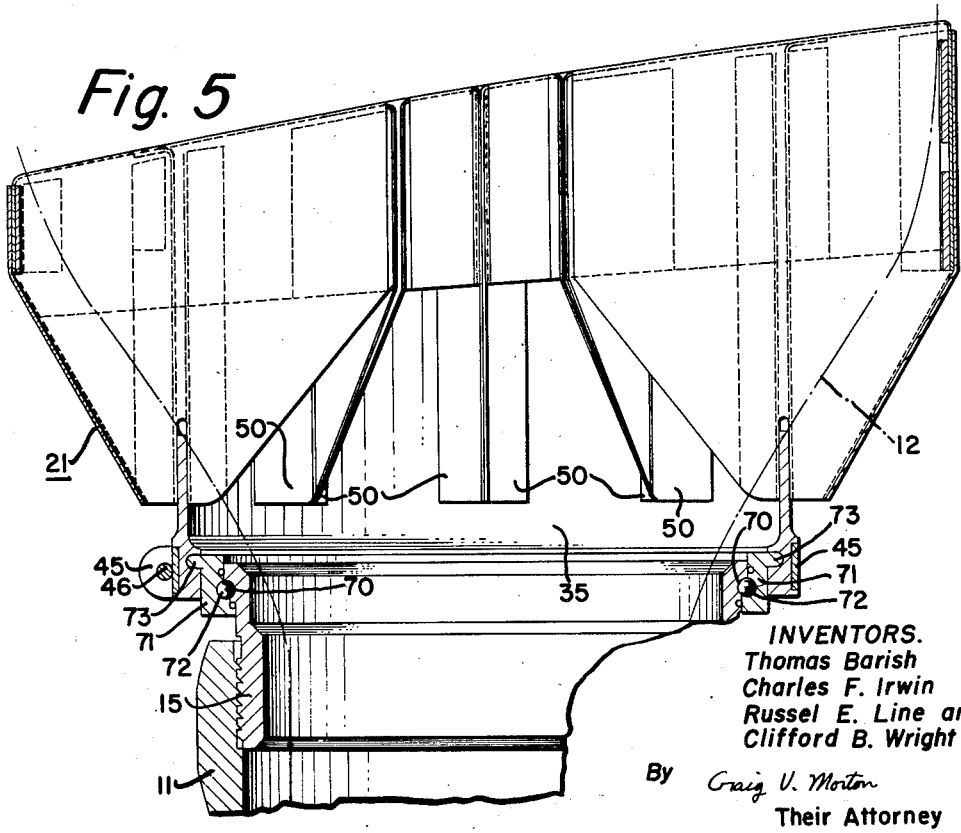
Fig. 5 is a sectional view taken along line 5—5 of Fig. 2, with the propeller blade outline shown in broken lines.
Figure 8:
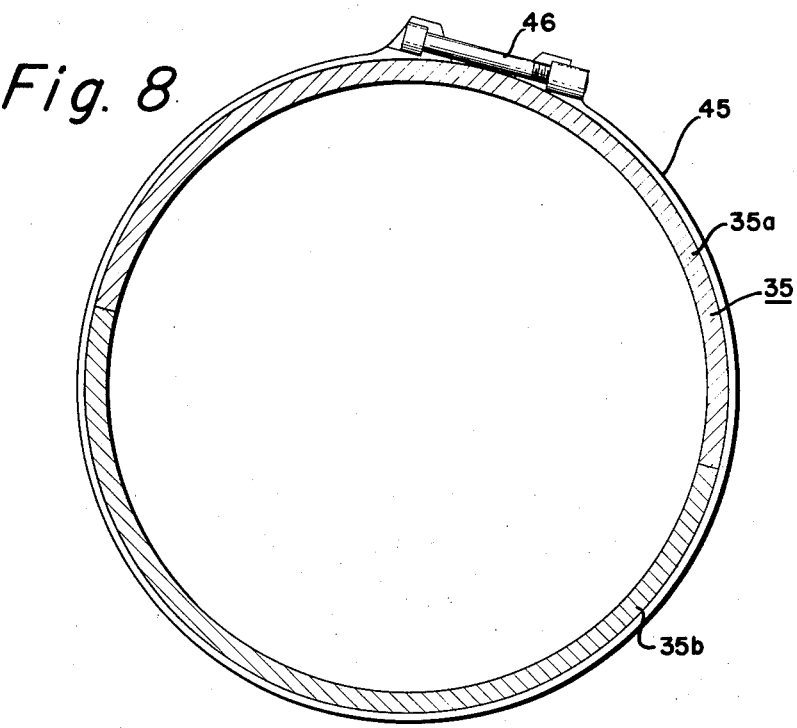
Fig. 8 is a view, in elevation, of the clamping ring, taken along line 8—8 of Fig. 4, with certain parts removed.

Thus, it is apparent that the blade seal assembly is made in two mating sections, one section comprising shell portion 21a, segments 22 through 25, and member 31, which are securely attached to the semi-circular member 35a. The other section comprises shell section 21b, segments 26 through 29, and member 32, which are securely attached to member 35b. After the subassemblies have been completed, they may be attached to the propeller hub to form a blade seal assembly, as shown in Fig. 1. Each hub socket 11 of the propeller hub 10 carries a blade retaining nut 15. As seen particularly in Fig. 1, the blade retaining nut engages the outer race of stack bearing 13, and after the nut 15 has been tightened to securely retain the blade 12 in the socket 11, the blade seal assembly 20 may be attached thereto. The blade retaining nut 15 is formed with an integral bearing race 70 on its external surface. The outer portion of the blade retaining nut 15 is encompassed by a ring 71, which constitutes the outer race for a bearing 72, as shown in Figs. 1 and 5. The outer race member 71 is formed with a shoulder 73, which is adapted to be received in the grooves 39 of the split ring members 35a and 35b. Thereafter, the members 35a and 35b, which constitute the split ring 35, are clamped together by means of a strap 45, which is received between the shoulders 40 and 41 and which is tightened by a bolt 46, as shown in Fig. 8. In this manner, the two subassemblies of the blade seal, which are carried by the semi-circular members 35a and 35b, are supported for rotation about the hub socket 11, while being restrained against radial movement relative thereto. In order to complete the assembly of the blade seal, the sections 21a and 21b, which constitute the split shell 21, are joined at diametrically opposite points by hinged joints 60. Thus, as is seen in Fig. 3, the cylindrical portions of sections 21a and 21b are formed with interlocking apertured portions through which a pin, or hinge pintle, 61 is inserted and retained.

Figure 9:
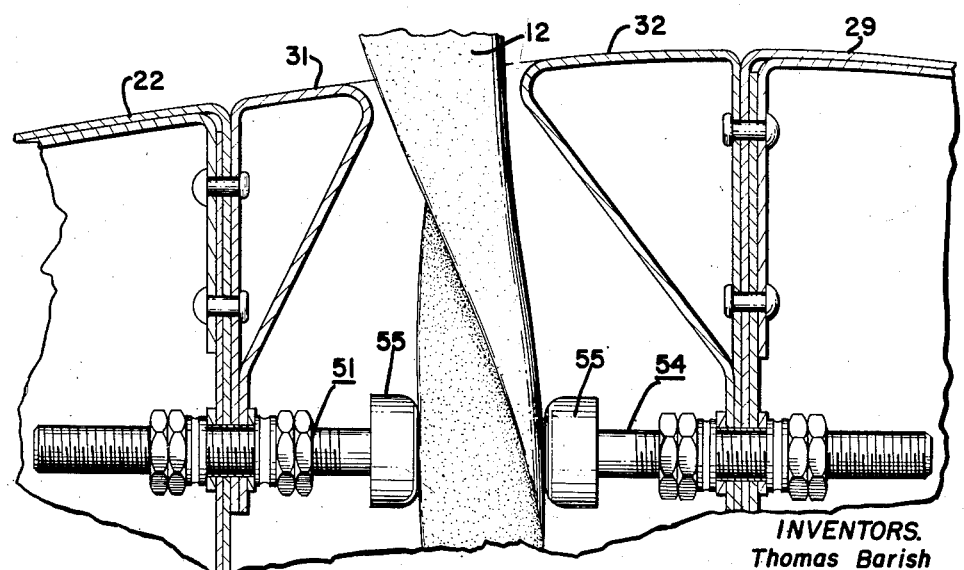
Fig. 9 is an enlarged sectional view taken along line 9—9 of Fig. 2, with the propeller blade shown extending through the seal assembly.

The present invention also contemplates the provision of means for gripping the airfoil section of the propeller blade 12, which means are shown in Figs. 2 and 9. These means comprise four bolt assemblies 51 through 54. Bolt assembly 51 is supported by the vertical gusset portions of segment 22 and member 31, as shown in Fig. 9, while bolt assembly 54 is supported by the vertical gusset portions of segments 29 and member 32, also as shown in Fig. 9. In a similar manner, bolt assembly 52 is supported by the vertical gusset portions of segment 25 and member 31, while the bolt assembly 53 is supported by the vertical gusset portions of segment 26 and member 32. Each of the bolt assemblies 51 through 54 carry resilient head pieces 55. Inasmuch as the airfoil section of the blade is of aerodynamic shape and may also be twisted, the bolt assemblies 51 through 54 are located so that the cushion heads 55 normally engage the blade surface. After the blade seal assembly has been attached to the propeller hub and the strap 45 has been tightened by bolt 46, and the hinge joints 60 have been completed, the bolts 51 through 54 may be adjusted so as to place the resilient heads 55 in gripping relation with the airfoil section of the blade 12. The resilient head pieces 55 prevent vibration of the blade seal assembly relative to the blade, and the bolt assemblies 51 through 54 are positioned so that the bolts grip the blade at a compound angle, that is, each bolt engages the blade perpendicularly to the blade surface at the point of engagement.

From the foregoing, it is apparent that the present invention provides a blade seal assembly which is supported entirely by the propeller hub, and which is rotatable relative thereto. Moreover, by the nature of its construction, the blade seal assembly may be moved from the propeller blade without removing the blade from its hub socket. This feature results in an arrangement wherein the time required for assembly and disassembly of the blade seals is greatly reduced.

While the embodiment of the present invention as herein disclosed, constitutes a preferred form, it is to be understood that other forms might be adopted.

What is claimed is as follows:

1. In an aircraft propeller having a hub and a plurality of blades journaled in said hub for pitch adjustment, said propeller hub being enclosed by a spinner having cutouts through which said blades project, a blade seal assembly for said cutouts comprising two subassemblies of identical construction, each subassembly comprising a semi-cylindrical shell section, a plurality of segments attached to said shell section, a blade seal member attached to said segments, and a semi-cylindrical ring section interconnected with said shell section, said segments, and said blade seal member; means for joining the shell sections to form an annular shell; means supporting each semi-cylindrical ring section for rotation about said hub; and means for clamping said ring sections together and thereby support said blade seal on said hub.

2. The combination set forth in claim 1 wherein the segments and the blade seal member of each subassembly form a cylindrical cover having an opening of airfoil section when the two subassemblies are joined.

3. The combination set forth in claim 2 wherein the means for joining the shell sections comprise a pair of hinges.

4. The combination set forth in claim 2 wherein the propeller hub includes sockets within which said blades are journaled for pitch adjustment, each blade being retained in its respective socket by a blade retaining nut having an integral bearing race formed on its external surface, and wherein the means for supporting each semi-cylindrical ring section for rotation comprises a bearing, the outer race of which is attached to said ring sections and the inner race of which is constituted by the bearing race of said blade retaining nut.

5. The combination set forth in claim 2 wherein each semi-cylindrical ring section is formed with a pair of spaced shoulders which define a groove, and wherein the means for clamping the ring sections together comprise a clamping ring situated in said grooves and drawn together by a bolt.

6. In an aircraft propeller having a hub with a plurality of hub sockets and a plurality of blades journaled in said hub sockets for pitch adjustment, said propeller hub being enclosed by a spinner having cut-outs through which said blades project, a blade seal assembly for said cutouts comprising two subassemblies of identical construction, each subassembly comprising a semi-cylindrical shell section, a plurality of segments attached to said shell section and having inwardly extending gusset portions, a blade seal member attached to said segments, and a semi-cylindrical ring section interconnected with the gusset portions of said segments; means joining said shell sections to form an annular shell, means supporting each semi-cylindrical ring section for rotation about a hub socket, and means for clamping said ring sections together and thereby support said blade seal on said hub socket.

7. The combination set forth in claim 6 wherein each semi-cylindrical ring section is formed with diametrically opposed notched portions through which the propeller blade supported in said hub socket extends.

8. The combination set forth in claim 6 wherein each semi-cylindrical ring section is formed with a plurality of axially extending slots, and wherein the gusset portions of said segments are disposed within said slots.

9. The combination set forth in claim 6 wherein the gusset portions of said segments have attached thereto brackets which are disposed on opposite sides of said semi-cylindrical ring section and riveted thereto so as to interconnect said gusset portions and said semi-cylindrical ring section.

References Cited in the file of this patent

UNITED STATES PATENTS

| | | |
|---|---|---|
| 2,522,083 | Avondoglio | Sept. 12, 1950 |
| 2,612,227 | Cushman | Sept. 30, 1952 |
| 2,683,494 | Chilton | July 13, 1954 |

FOREIGN PATENTS

| | | |
|---|---|---|
| 638,088 | Great Britain | May 31, 1950 |